(12) United States Patent
Daly et al.

(10) Patent No.: US 9,308,604 B1
(45) Date of Patent: Apr. 12, 2016

(54) ANTI-TIN WHISKER SOLDER AND METHOD OF MANUFACTURE THEREOF

(75) Inventors: Gregory T. Daly, Glendora, NJ (US); Gary H. Yan, Cherry Hill, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 890 days.

(21) Appl. No.: 13/585,037

(22) Filed: Aug. 14, 2012

Related U.S. Application Data

(63) Continuation-in-part of application No. 12/365,579, filed on Feb. 4, 2009, now Pat. No. 8,562,755.

(60) Provisional application No. 61/026,698, filed on Feb. 6, 2008.

(51) Int. Cl.
*B23K 35/26* (2006.01)

(52) U.S. Cl.
CPC .................. *B23K 35/262* (2013.01)

(58) Field of Classification Search
CPC .................................................. B23K 35/262
USPC ............................................................. 148/24
IPC .................................................. B23K 35/3601
See application file for complete search history.

(56) References Cited

U.S. PATENT DOCUMENTS

| | | | |
|---|---|---|---|
| 7,572,343 B2 * | 8/2009 | Lee et al. ................. | 148/23 |
| 7,575,343 B2 | 8/2009 | Li et al. | |
| 2004/0054047 A1 * | 3/2004 | Lai et al. .................. | 524/268 |

FOREIGN PATENT DOCUMENTS

WO 2005/016580 2/2005

OTHER PUBLICATIONS

NASA Goddard Space Flight Center Photo of the Month; http://nepp.nasa.gov/whisker/photos/pom/.
NASA Photo Gallery; http://nepp.nasa.gov/whisker/photos/index.html.
McCorvey; "Tin Whiskers Found on ATVC S/N 0034;" http://nepp.gov/whisker/reference/tech_papers/2006-Leidecker-Tin-Whisker-Failures.pdf (Mar. 8, 2006).
NASA Goddard Space Flight Center; http://nepp.nasa.gov/whisker/photos/pom/2004april.htm.
Dr. Bob Esser; "Risk Assessment of Sn Plated Solder Lug;" DfR Solutions.
Dr. Henning Leidecker et al; "Tin Whiskers: A History of Documented Electrical System Failures—A Briefing Prepared for the Space Shuttle Program Office;" (Apr. 2006).
Hybrid Plastics—POSS Shielded® (updated Oct. 2006).
Hybrid Plastics—POSS Short-Stop® (updated Jul. 2008).
Andre Lee et al; "Nanostructured Chemicals Poss® in Pb-free Electronic Solders," presentation given at the 2007 Advanced Materials Symposium (2007).

* cited by examiner

*Primary Examiner* — Weiping Zhu
(74) *Attorney, Agent, or Firm* — Howard IP Law Group

(57) ABSTRACT

A lead-free solder composition including about 90% to about 99% by weight of a lead-free tin solder based on the total weight of the lead-free solder composition and about 1% to about 10% by weight of a polyhedral oligomeric silsesquioxane based on the total weight of the lead-free solder composition.

11 Claims, 3 Drawing Sheets

US 9,308,604 B1

ANTI-TIN WHISKER SOLDER AND METHOD OF MANUFACTURE THEREOF

CROSS-REFERENCE TO RELATED APPLICATIONS

This application is a continuation-in-part of copending U.S. patent application Ser. No. 12/365,579 entitled ANTI-TIN WHISKER SOLDER filed Feb. 4, 2009, which claims the benefit of U.S. Provisional Application No. 61/026,698, filed Feb. 6, 2008, the entire contents of which are herein incorporated by reference for all purposes.

FIELD OF THE INVENTION

This invention relates to lead-free solder compositions. More particularly, this invention relates lead-free tin solder compositions and related methods.

BACKGROUND OF THE INVENTION

Tin-lead has been a worldwide solder staple for many decades due to its advantageous low melting range forming a stable joint with no damage to heat-sensitive parts. Recent legislation by the European Union has required the removal of lead from manufactured products via the Directive entitled: "Restriction of Hazardous Substances (RoHS)."

A preferred alternative solder would be a lead-free tin solder. This poses manufacturing problems due to a phenomenon known as tin whiskers. Tin whiskers are individual crystals of tin that, for example, grow spontaneously from a tin coated surface of a part, as shown in FIGS. 1A and 1B (see: http://nepp.nasa.gov/whisker/photos/pom/2004april.htm). These tin whiskers can cause deleterious problems in electronic assemblies, such as electrical shorts and, if broken loose, mechanical damage.

Accordingly, there is a need for a lead-free tin solder that prevents the growth of tin whiskers, thereby eliminating the aforementioned problems.

SUMMARY

Disclosed herein is a lead-free solder composition comprising about 90% to about 99% by weight of a lead-free tin solder based on the total weight of the lead-free solder composition and about 1% to about 10% by weight of a polyhedral oligomeric silsesquioxane based on the total weight of the lead-free solder composition.

Further disclosed herein is a method for preventing tin whiskers in a lead-free solder. The method includes providing a lead-free tin solder base and adding a polyhedral oligomeric silsesquioxane containing a thiol functional group to the lead-free tin solder base. The thiol group forms covalent bonds with the tin element of the lead-free tin solder, reducing the number of sites for potential tin whisker growth. An embodiment of this method may comprise the steps of providing a first amount of lead-free tin solder, and mixing a second amount of polyhedral oligomeric silsesquioxane with the first amount of lead-free tin solder. The first and second amounts are selected to provide a resulting composition containing about 90% to about 99% by weight of the lead-free tin solder based on the total weight of the resulting composition and about 1% to about 10% by weight of the polyhedral oligomeric silsesquioxane based on the total weight of the resulting composition.

DETAILED DESCRIPTION

Figure 1A:
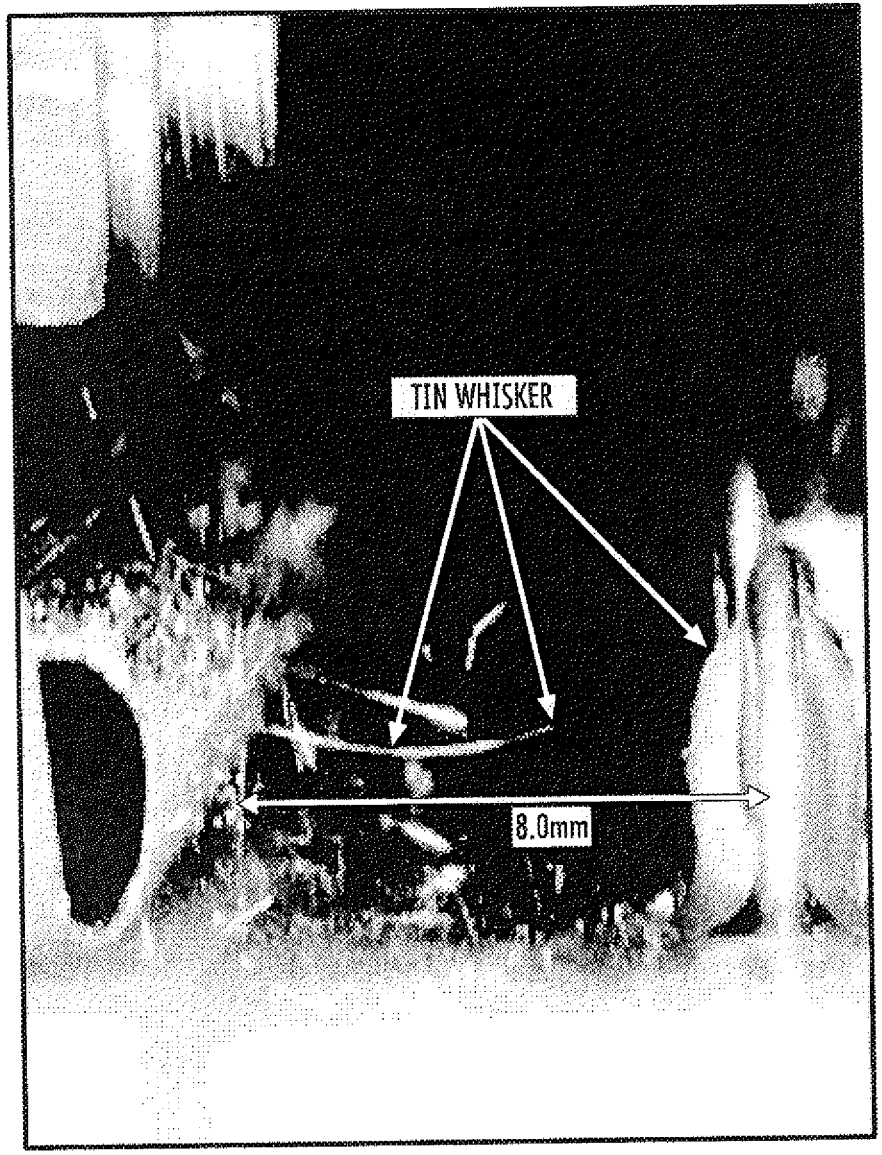
FIGS. 1A and 1B are pictures of parts which have been plated using a conventional tin-plate composition.
Figure 1B:
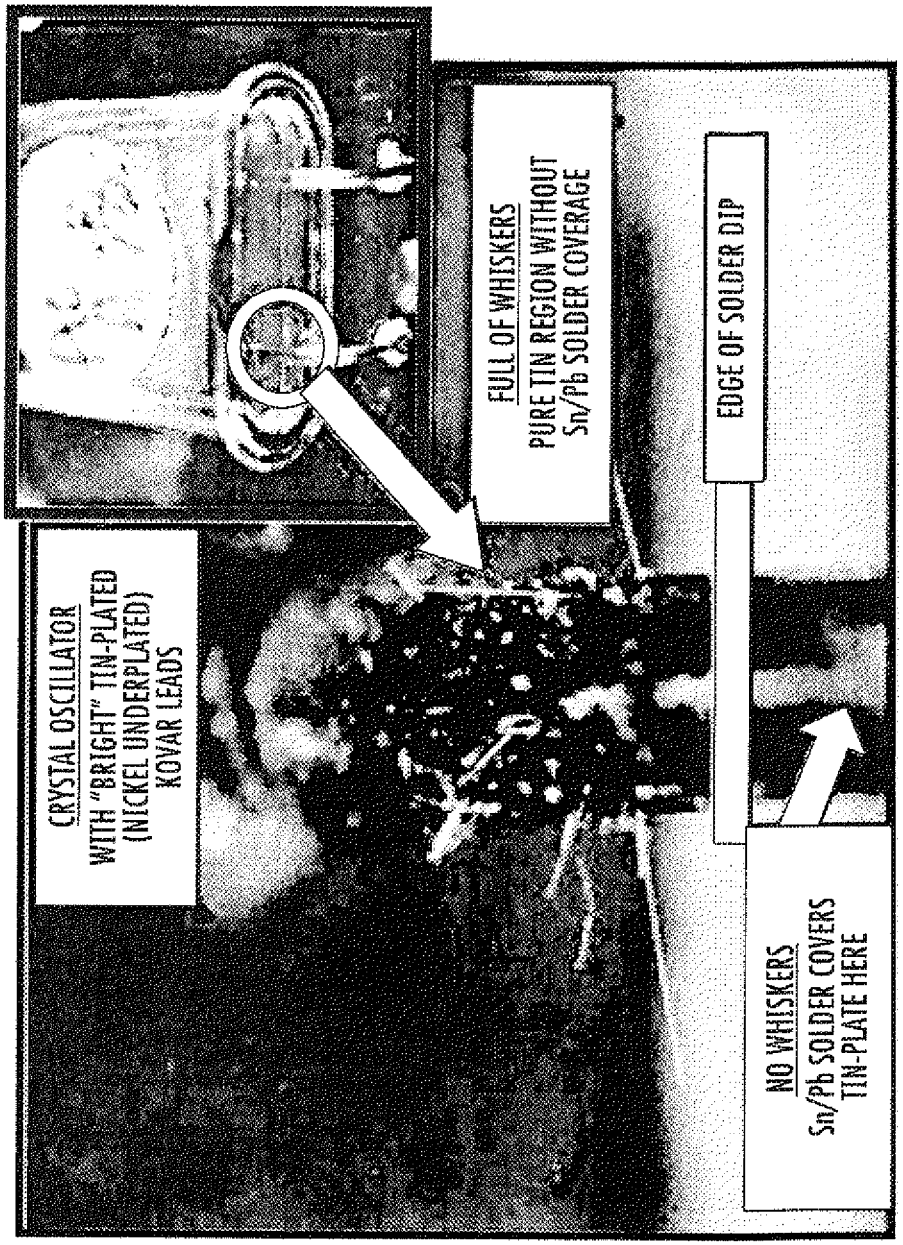

A lead-free solder composition, in one embodiment, comprises a mixture including a lead-free or substantially lead-free tin solder (collectively referred to hereinafter as lead-free tin solder) and at least one polyhedral oligomeric silsesquioxane (POSS). POSS is a nano-structured material that comprises a cage-like inorganic core made with a silicon and oxygen framework. Including the POSS within the solder composition makes it possible to leverage the nanocomposite properties of the POSS in order to deter and/or reduce electromigration effects, which are believed to induce tin whisker growth through high current density stresses. Both electromigration and compressive stresses are generally viewed to be leading cause of tin whiskers in lead-free tin solder. The solder may be provided in any desired form including, without limitation, a paste, a wire, and a bar.

The lead-free tin solder in the composition may comprise a tin-silver alloy solder. The tin-silver alloy provides high joint strength as compared with tin-lead solder, and is intended for replacing tin-lead solder. In one embodiment of the tin-silver alloy solder, the tin comprises a weight percent concentration in the alloy of 96.5% and the silver comprises a weight percent concentration of 3.5% in the alloy.

In another particularly advantageous embodiment, the lead-free tin solder in the composition may also comprise a tin-silver-copper alloy solder. The copper in the composition lowers the melting point of the composition, improves wettability of the molten solder, and improves the thermal cycle fatigue resistance of the resulting solder joint. In one embodiment of the tin-silver-copper alloy, the tin comprises a weight percent concentration in the alloy of 95.5%, the silver comprises a weight percent concentration of 3.8% in the alloy and the copper comprises a weight percent concentration of 0.7% in the alloy. In another embodiment of the tin-silver-copper alloy, the tin comprises a weight percent concentration in the alloy of 95.5%, the silver comprises a weight percent concentration of 3.9% in the alloy and the copper comprises a weight percent concentration of 0.6% in the alloy. In a further embodiment of the tin-silver-copper alloy, the tin comprises a weight percent concentration in the alloy of 95.5%, the silver comprises a weight percent concentration of 4.0% in the alloy and the copper comprises a weight percent concentration of 0.5% in the alloy. In still a further embodiment of the tin-silver-copper alloy, the tin comprises a weight percent concentration of 96.5% in the alloy, the silver comprises a weight percent concentration of 3.0% in the alloy, and the copper comprises a weight percent concentration of 0.5% in the alloy.

The amount of POSS in the composition typically comprises about 1% to about 10% by weight within the lead-free solder matrix. In one preferred embodiment, the amount of POSS in the composition comprises 3% to 5% by weight within the lead-free solder matrix.

The type of POSS in the composition may comprise without limitation, TH1550 Mercaptopropylisobutyl POSS, S01458 Trisilanolphenyl POSS, AMO273 Aminopropylphenyl POSS, TH1555 Mercaptopropylisooctyl POSS, S01440 Disilanolisobutyl POSS, S01455 Trisilanolisooctyl POSS, S01460 Tetrasilanolphenyl POSS, SH1310 Octasilane POSS, S01450 Trisilanolisobutyl POSS, and any combination thereof. In a preferred embodiment, the POSS in the composition may comprise TH1550 Mercaptopropylisobutyl POSS, S01458 Trisilanolphenyl POSS, AMO273 Aminopropylphenyl POSS, and any combination thereof.

Regarding the use of a POSS comprising a thiol group (SH), for example, mercaptopropylisobutyl and mercaptopropylisooctyl, the Applicants have determined that, when added to a lead-free tin solder comprising about 90% to about 99% by weight lead-free tin solder, and in particular a lead-free tin solder comprising about 0.5% to about 0.7% by weight copper, and about 3.0% to about 4.0% by weight silver, and a balance of tin, the thiol group reacts directly with the tin surface of the solder. More specifically, it is believed the thiol group breaks through the oxide layer of the tin element to form covalent bonds therewith. This bonding reduces the number of potential sites for tin whisker growth.

Accordingly, embodiments of the present disclosure are directed to methods for preventing tin whiskers in a lead-free solder. These methods include the steps of adding a POSS including a thiol functional group to the tin element of a lead-free tin solder such that the thiol group forms covalent bonds with the tin, thereby reducing the number of potential tin whisker growth sites. In a more particular embodiment, a method of preventing the growth of tin whiskers comprises providing a first amount of lead-free tin solder, and mixing a second amount of POSS with the first amount of lead-free tin solder in order to achieve a resulting composition containing about 90% to and 99% by weight of the lead-free tin solder based on the total weight of the resulting composition and about 1% to about 10% be weight of the POSS based on the total weight of the resulting composition.

Figure 2:
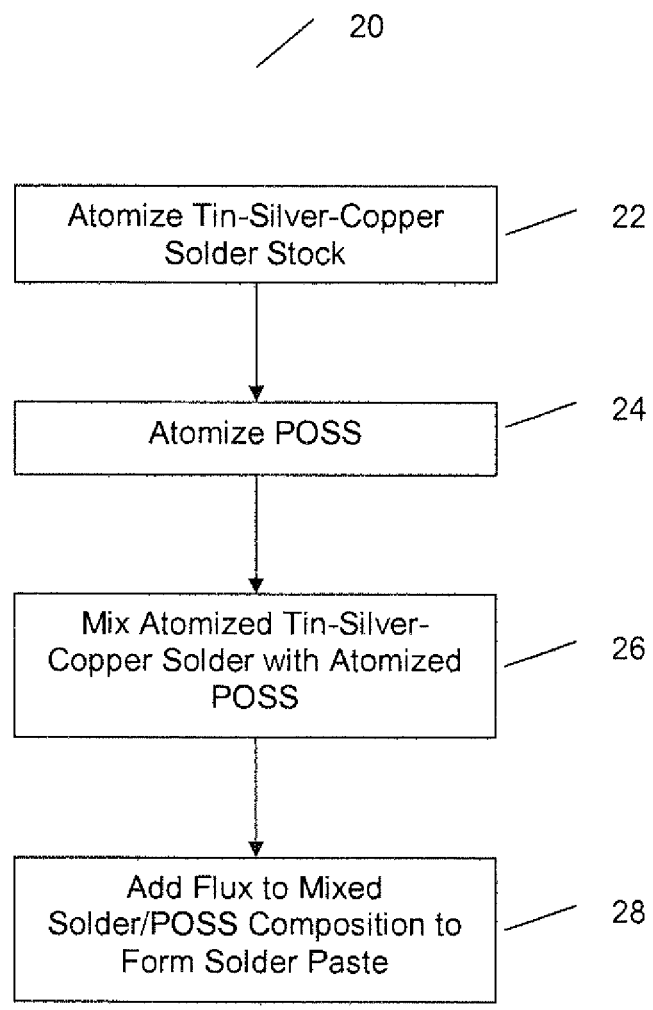
FIG. 2 is a process diagram illustrating an exemplary method of preparing a solder according to an embodiment of the present disclosure.

Referring generally to FIG. 2, a particularly advantageous method of preventing tin whiskers in a solder composition is provided. Method 20 includes the steps of separately atomizing, or reducing to powder form, both lead-free tin solder (e.g. tin-silver-copper solder) stock (step 22) and dry POSS (step 24) prior to mixing. These atomizing processes may be achieved using, by way of non-limiting example only, ball milling or other grinding operations. In step 26, once atomized, the POSS and lead-free solder components may be mixed together in, for example, a shaking process performed in a three-dimensional environment for not less than one (1) hour. This dry component mixing process ensures sufficient mixing, thereby improving the homogenization of the solder and POSS components. In embodiments which utilize a thiol group POSS, this mixing process results in wide-spread covalent bonding between the thiol group and the surface of the tin, reducing tin whisker formation. Once a sufficiently homogeneous mixture has been achieved, the solder/POSS composition may be formed into a solder paste by the introduction of a flux component in step 28.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for preventing tin whiskers in a lead-free solder, the method comprising the steps of:

providing a first amount of lead-free tin solder; and mixing a second amount of polyhedral oligomeric silsesquioxane with the first amount of lead-free tin solder, wherein the first and second amounts are selected to provide a resulting composition containing about 90% to about 99% by weight of the lead-free tin solder based on the total weight of the resulting composition and about 1% to about 10% by weight of the polyhedral oligomeric silsesquioxane based on the total weight of the resulting composition, and wherein the polyhedral oligomeric silsesquioxane contains at least one mercaptopropyl group.

2. The method of claim 1, wherein the lead-free tin solder comprises about 3.5% by weight of silver and a balance of tin.

3. The method of claim 1, wherein the lead-free tin solder comprises about 0.5% to about 0.7% by weight of copper, about 3.0% to about 4.0% by weight of silver, and a balance of tin.

4. The method of claim 1, further comprising the step of atomizing the lead-free tin solder.

5. The method of claim 4, further comprising the step of atomizing the polyhedral oligomeric silsesquioxane.

6. The method of claim 5, wherein the step of mixing the second amount of polyhedral oligomeric silsesquioxane with the first amount of lead-free tin solder comprises mixing the atomized polyhedral oligomeric silsesquioxane and the atomized lead-free tin solder.

7. The method of claim 6, further comprising the step of adding flux to the mixed polyhedral oligomeric silsesquioxane and lead-free solder to form a solder paste.

8. The method of claim 1, wherein the polyhedral oligomeric silsesquioxane comprises at least one of mercaptopropylisobutyl and mercaptopropylisooctyl.

9. A method for preventing tin whiskers in a lead-free solder, the method comprising the steps of:

providing a lead-free tin solder base; and adding a polyhedral oligomeric silsesquioxane containing a thiol functional group to the lead-free tin solder base, the thiol group forming covalent bonds with the tin element of the lead-free tin solder, reducing the number of sites for potential tin whisker growth, wherein the polyhedral oligomeric silsesquioxane contains at least one mercaptopropyl group.

10. The method of claim 9, wherein the amount of lead-free tin solder and polyhedral oligomeric silsesquioxane are selected to provide a resulting composition containing about 90% to about 99% by weight of the lead-free tin solder based on the total weight of the resulting composition and about 1% to about 10% by weight of the polyhedral oligomeric silsesquioxane based on the total weight of the resulting composition.

11. The method of claim 9, wherein the lead-free tin solder comprises about 0.5% to about 0.7% by weight of copper, about 3.0% to about 4.0% by weight of silver, and a balance of tin.

\* \* \* \* \*